(12) United States Patent
Führer

(10) Patent No.: US 10,385,979 B2
(45) Date of Patent: Aug. 20, 2019

(54) ARRANGEMENT FOR OPERATING A SHUT-OFF VALVE HAVING A TAPERED PLUG

(71) Applicant: MAGDEBURGER INDUSTRIEARMATUR-MANUFAKTUR GMBH, Magdeburg (DE)

(72) Inventor: Michael Führer, Biederitz (DE)

(73) Assignee: MAGDEBURGER INDUSTRIEARMATUR-MANUFAKTUR GMBH, Magdeburg (DE)

( * ) Notice: Subject to any disclaimer, the term of this patent is extended or adjusted under 35 U.S.C. 154(b) by 34 days.

(21) Appl. No.: 15/881,563

(22) Filed: Jan. 26, 2018

(65) Prior Publication Data

US 2018/0149274 A1 May 31, 2018

Related U.S. Application Data

(63) Continuation of application No. 13/887,530, filed on May 6, 2013, now abandoned.

(51) Int. Cl.
*F16K 5/02* (2006.01)
*F16K 5/16* (2006.01)

(52) U.S. Cl.
CPC .............. *F16K 5/0242* (2013.01); *F16K 5/16* (2013.01); *F16K 5/162* (2013.01); *F16K 5/163* (2013.01)

(58) Field of Classification Search
CPC .......... F16K 5/0242; F16K 5/16; F16K 5/163; F16K 5/162; F16K 5/165; F16K 5/166; F16K 5/167
See application file for complete search history.

(56) References Cited

U.S. PATENT DOCUMENTS

| 611,472 A | 9/1898 | Gillespie |
|---|---|---|
| 695,838 A | 3/1902 | Richie |

(Continued)

FOREIGN PATENT DOCUMENTS

| DE | 2552526 A1 | 5/1977 |
|---|---|---|
| DE | 10039136 A1 | 2/2002 |

(Continued)

OTHER PUBLICATIONS

Crane Co., "Pacific Valves®—Wedgeplug Brochure", CRANE Energy Flow Solutions Brochure, 2011, pp. 1-12, CRANE Energy Flow Solutions, The Woodlands, Texas (2011).

*Primary Examiner* — Mary E McManmon
*Assistant Examiner* — Hailey K. Do
(74) *Attorney, Agent, or Firm* — Cohen & Hildebrand, PLLC

(57) ABSTRACT

Arrangement for actuating shut-off valve with tapered plug, has housing in which hollow actuating cylinder is coaxially supported for rotation and with an actuating shaft aligned with the coaxial axis firmly attached. Output cylinder is coaxially arranged in hollow actuating cylinder. The output cylinder is movable relative to hollow drive cylinder axially and radially. Spindle is attached on output cylinder opposite actuating shaft and aligned with coaxial axis; tapered plug being fastened on end of spindle facing away from output cylinder. At least one radially outwardly directed pin is arranged on outer peripheral surface of output cylinder. Outer surfaces of housing and hollow actuating cylinder have each at least one guideway extending over radial sector of outer surfaces, with which pin is operatively connected as a respective sliding block. At least the guideway arranged in outer surface of hollow actuating cylinder is formed as a through-opening through which pin passes.

16 Claims, 5 Drawing Sheets

(56) References Cited

U.S. PATENT DOCUMENTS

| | | | |
|---|---|---|---|
| 839,953 A * | 1/1907 | Race | F16K 31/528 |
| | | | 251/252 |
| 900,598 A | 10/1908 | Schuermann | |
| 1,589,696 A | 6/1926 | Holtz | |
| 2,412,529 A * | 12/1946 | Mueller | F16K 5/162 |
| | | | 251/163 |
| 2,443,995 A | 6/1948 | Snyder | |
| 2,459,682 A * | 1/1949 | Carrie | F16K 5/162 |
| | | | 251/163 |
| 2,634,946 A | 4/1953 | Mueller et al. | |
| 2,705,609 A | 4/1955 | Prescott | |
| 3,492,880 A | 2/1970 | Pearson | |
| 3,517,975 A | 6/1970 | Davidson | |
| 6,860,167 B2 | 3/2005 | Schmidt et al. | |
| 2010/0108932 A1 | 5/2010 | Bauer | |
| 2016/0265588 A1 * | 9/2016 | Devitt | F16C 32/0618 |

FOREIGN PATENT DOCUMENTS

| | | | |
|---|---|---|---|
| DE | 102012014515 A1 * | 7/2013 | F16K 31/5284 |
| DE | 102013012847 A1 | 2/2015 | |
| DE | 102013215848 A1 | 2/2015 | |
| GB | 461653 | 2/1937 | |
| GB | 595700 | 12/1947 | |
| WO | 2004/087485 A1 | 4/2004 | |

\* cited by examiner

ARRANGEMENT FOR OPERATING A SHUT-OFF VALVE HAVING A TAPERED PLUG

CROSS-REFERENCE TO RELATED APPLICATIONS

This application is a continuation application of U.S. patent application Ser. No. 13/887,530, filed May 6, 2013, which is herein incorporated by reference in its entirety.

BACKGROUND OF THE INVENTION

(1) Field of the Invention

The invention relates to an arrangement for operating a shut-off valve having a tapered plug, which are used in particular in the chemical, in particular the petrochemical industry, for closing and opening lines carrying fluid flows.

Shut-off valves open or close the flow of a fluid in a pipe. Closing or opening the flow occurs by a 90° rotation of the shut-off element. Shut-off valves have a completely sealing structure.

The shut-off elements of a shut-off valve are called plugs. They are constructed as ball plugs or tapered plugs. Tapered plugs have advantages relating to their manufacture and advantageous shut-off features and are mainly used in shut-off valves for special applications in industrial plants.

An adjustment to intermediate positions is not provided for shut-off valves. The operating modes of shut-off valves are essentially limited to open or closed.

Shut-off valves can be used for all pipe gauges and pressure ratings. They have a minimum flow resistance, since flow is generally not deflected or constricted and the flow medium passes through the shut-off valve in the same way as through a straight pipe section.

Advantageous are also short actuating times because the shut-off element has only to perform a 90° rotation. The required 90° rotation of the operating spindle of the shut-off element in the gland seal has a more favorable leakage behavior compared to valves and gate valves. During actuation of the shut-off element, no or only small linear strokes occur in contrast to valves and gate valves, which has a positive effect on the life of the seal. It also improves the sealing properties. Shut-off valves are therefore frequently used in pipeline systems carrying toxic, flammable or otherwise hazardous fluids.

Disadvantageous are the following facts: The reliable shut-off function of shut-off valves may be inadequate due to contamination. Shut-off valves are unable to control the fluid flow. Furthermore, they take up a comparatively large space in a pipeline. When the shut-off valve is closed, a fluid residue remains in the bore of the shut-off element.

The operation of shut-off valves, which are the subject of the invention, is commonly performed by using electric, pneumatic or hydraulic actuators, with which the tapered plug as the shut-off element is rotated by a spindle from the closed to the open position or vice versa. A rotation angle of 90° is thereby realized.

Since the reliability of the shut-off function largely depends on the exact fit of the shut-off element in its seat, the close fit of the tapered plug in the seat initially requires considerable forces for rotating the tapered plug. This is disadvantageous, on one hand, because the respective electric, pneumatic or hydraulic actuating units as well as the force-transmitting spindle must be dimensioned commensurate with the large required torque, which results in increased material and labor costs as well as in increased installation space.

On the other hand, a rotation of the tapered plug with a tight fit in its seat performed with a large torque increases wear on the conical plug and seat surfaces, which in turn increases maintenance and repair expenses and the risk of a leak.

(2) Description of Related Art

Numerous proposed solutions of the prior art are aimed at eliminating these disadvantages.

Thus, for example, the British publication GB 461 653 A proposes a solution wherein the tapered plug is raised slightly from its seat during its 90° rotation. In this invention, a nut is therefore integrated in the actuating element, which forms as a screw cap part of the actuating spindle and is coupled with the spindle by a lost motion coupling. In this way, rotation of the actuating spindle in the opening direction causes the tapered plug to rise from its seat before it is rotated into the open position. Conversely, a rotation of the actuating spindle in the closure direction pushes the tapered plug back down into its seat after returning to the closed position. The disadvantage of this solution is that the arrangement of the lost-motion coupling results in significant additional manufacturing and installation costs.

The British document GB 595 700 A also proposes an arrangement which is supposed to solve the problem associated with, on one hand, a high sealing pressure in tapered plugs and, on the other hand, a desired low operating torque during the rotation of the tapered plug. First, a tapered plug is provided having a pair of precisely mated conical surfaces in conjunction with strong axial springs at the spindle end, ensuring the desired sealing effect in the closed state of the shut-off valve. To relieve pressure during the rotation, the aforementioned shut-off valve has additional features which relieve the spring pressure during the rotation. This prevents wear of the conical surfaces of the seat and the tapered plug. At the instance when the valve is opened, the end bearing of the actuating spindle is completely relieved so that the tapered plug can be rotated without undue friction.

A tapered-plug valve of the aforedescribed type has as a relief mechanism a worm or helical gear acting on a relief cam, which due to its axial component adjusts the final pressure to the movement state. This proposed solution is also associated with significantly higher manufacturing and installation costs.

The current state of the industrial technology for reliable and gentle actuation of shut-off is represented by the so-called Wedge Torque Operator from the company PACIFIC VALVE [see PacificValvesWedgeplugBrochureCV-408.pdf].

The actuation concept of such tapered plug valve with a metal seal also includes
1. raising the tapered plug from the seat,
2. rotating the tapered plug by 90° and
3. lowering the tapered plug into the seat to restore leak tightness of the valve.

This technically very demanding task is realized by way of a gear, such as the so-called Wedge Torque Operator or Lift-torque operator mentioned above. Whereas, like with a common gate valve, only a rotary actuator operates on the actuating spindle of the tapered plug, a gear connected below takes over the raising, rotating and lowering function of the actuating spindle with the tapered plug. The internal kinematics of this gear mechanism is complex, which in turn disadvantageously causes high production, assembly and maintenance costs.

BRIEF SUMMARY OF THE INVENTION

It is therefore an object to develop an arrangement for actuating a shut-off valve with a tapered plug, wherein the movement necessary for a reliable and low-wear operation of the shut-off valve in order to raise, rotate and lower the actuating spindle with the tapered plug can be generated in a simple and low-cost manner.

This object of the invention is attained by the features of the independent claim, with additional dependent claims reciting advantageous embodiments of the invention.

An arrangement according to the invention for actuating a shut-off valve with a tapered plug has a housing in which a hollow actuating cylinder is coaxially and rotatably supported and on which an actuating shaft aligned with the coaxial axis is fixedly attached. An output cylinder is coaxially arranged in the hollow actuation cylinder. The output cylinder is supported for axial and radial movement with respect to the hollow actuating cylinder. A spindle is fixedly secured to the output cylinder along the coaxial axis in opposition to the actuating shaft, with a tapered plug attached on the end of the spindle facing away from the output cylinder. At least one radially outwardly directed pin is arranged on the outer peripheral surface of the output cylinder. The outer surfaces of the housing and of the hollow actuating cylinder each have at least one corresponding guideway extending over a radial sector of the output surfaces with which the pin is operatively connected in form of a corresponding sliding block. At least the guideway arranged in the outer surface of the hollow actuating cylinder is formed as a through-opening through which the pin passes.

The particular advantage of the invention is based on a very simple gear structure having few gear parts, with which the raising, rotating and lowering movement of the tapered plug required for reliable and low-wear operation of the shut-off valve can be realized.

In a preferred embodiment of the invention, two pins which are radially outwardly oriented in opposite directions are arranged on the outer peripheral surface of the output cylinder, wherein the outer surfaces of the housing and of the hollow actuating cylinder each have two guideways extending over radially opposing sectors of the peripheral surfaces with which the pin is connected in the form of a total of four sliding blocks.

Preferably, the guideways in the outer surface of the housing are also formed as through-openings.

In another preferred embodiment of the invention, a roller is arranged and positioned on the pin for rotation about the longitudinal axis of the pin so that the roller can be moved in the guideway disposed in the outer surface of the hollow actuation cylinder and implemented as a through-hole in the manner of a sliding block.

In a particularly preferred embodiment of the invention, two rollers which are spaced apart in the longitudinal axis of the pin and which are rotatable about the longitudinal axis of the pin are arranged and positioned so that one of the rollers is movable as a sliding block in the guideway formed as a through-opening in the outer surface of the hollow actuating cylinder, whereas the other roller is movable as a sliding block in the guideway formed as a through-opening in the outer surface of the housing.

The rollers are preferably constructed so that they can be rollably introduced into the guideways formed as through-openings along a longitudinal side of these through-openings. This is, for example, realized by making the outer diameter of the rollers smaller than the width of these through-openings.

Preferably, the hollow actuating cylinder may also be rotatably supported in the housing by roller bearings.

A spring, which is preferably constructed as a diaphragm spring and biased between the housing and the output cylinder, is arranged in the housing, such that the force of the spring is effective in the direction of the lifting movement of the tapered plug, i.e. opposite to the direction of movement for lowering of the tapered plug for closing or opening the shut-off valve.

In the preferred installation position of the shut-off valve, i.e. with vertically aligned spindle and in the effective direction of gravity at the lower end of the tapered plug arranged on the lower end of the spindle, the spring force is dimensioned so that, on the one hand, it compensates for a sum of the weight forces acting on the output cylinder, the spindle and the tapered plug and, on the other hand, it compensates for a force which opposes the force lifting the tapered plug, when the shut-off valve is flushed during the operation for opening or closing the shut-off valve. This force opposing the lifting movement of the tapered plug when the shut-off valve is opened or closed, which needs to be compensated, corresponds to approximately 5 to 7.5 times the sum of the weight forces acting on the output cylinder, the spindle and the tapered plug. The spring force is thus dimensioned in accordance with the sum of the weight forces acting on the output cylinder, the spindle and the tapered plug plus 5 to 7.5 times, preferably 6 times, this sum, resulting in a total spring force of:

$$\text{Spring force} = 6 \ldots 8.5 \times (\text{weight force}_{output\ cylinder} + \text{weight force}_{spindle} + \text{weight force}_{tapered\ plug})$$

It is customary to flush the space in the housing of a shut-off valve above the tapered plug, i.e. the space into which the tapered plug is moved during the operation of opening or closing the shut-off valve, during the operation of the shut-off valve with a flushing medium to prevent deposits in that space above the tapered plug and to clean the seats of the shut-off valve. The flushing medium is introduced into the aforementioned cavity at a pressure that is higher than the pressure of the medium in the pipe in which the shut-off valve is installed. When the tapered plug is lifted to open or close the shut-off valve, flushing medium flows into the pipe through the resulting gap between the sealing surfaces. The resulting flow velocity of the flushing medium in the pipe may be considerable and causes a suction force, which opposes the force to lift the tapered plug. Another force opposing lifting of the tapered plug results from the pressure difference between the pressure of the flushing medium and the pressure of the medium in the pipe in which the shut-off valve is installed. The force of the spring in the direction of the lifting movement of the tapered plug is dimensioned so that it compensates both the weight forces acting on the output cylinder, the spindle and the tapered plug as well as the forces introduced by flushing the aforementioned cavity in the shut-off valve with a flushing medium having a higher pressure than the pressure of the medium in the pipe in which the shut-off valve is installed.

Advantageously, the housing is composed of an upper housing part and a lower housing part. The upper housing part has a housing cover with a through-opening for passage of the actuating shaft, whereas the lower housing part has a housing cover with a through-opening for the passage of the spindle.

With the application of the claimed arrangement for actuating a shut-off valve with a tapered plug, quite large savings in the manufacture and the maintenance of actuators for shut-off valve with tapered plugs can be attained by eliminating complicated gear structures while still attaining low-wear and low-maintenance operation of shut-off valves with tapered plugs.

Advantageously, in contrast to the conventional solutions, the space required by the claimed device for actuating a shut-off valve with tapered plug is also significantly reduced, thus allowing the actuators to have much smaller dimensions.

The invention will now be explained in more detail with reference to an exemplary embodiment.

BRIEF DESCRIPTION OF THE DRAWINGS

The accompanying drawings show in

DETAILED DESCRIPTION OF THE INVENTION

Figure 1:
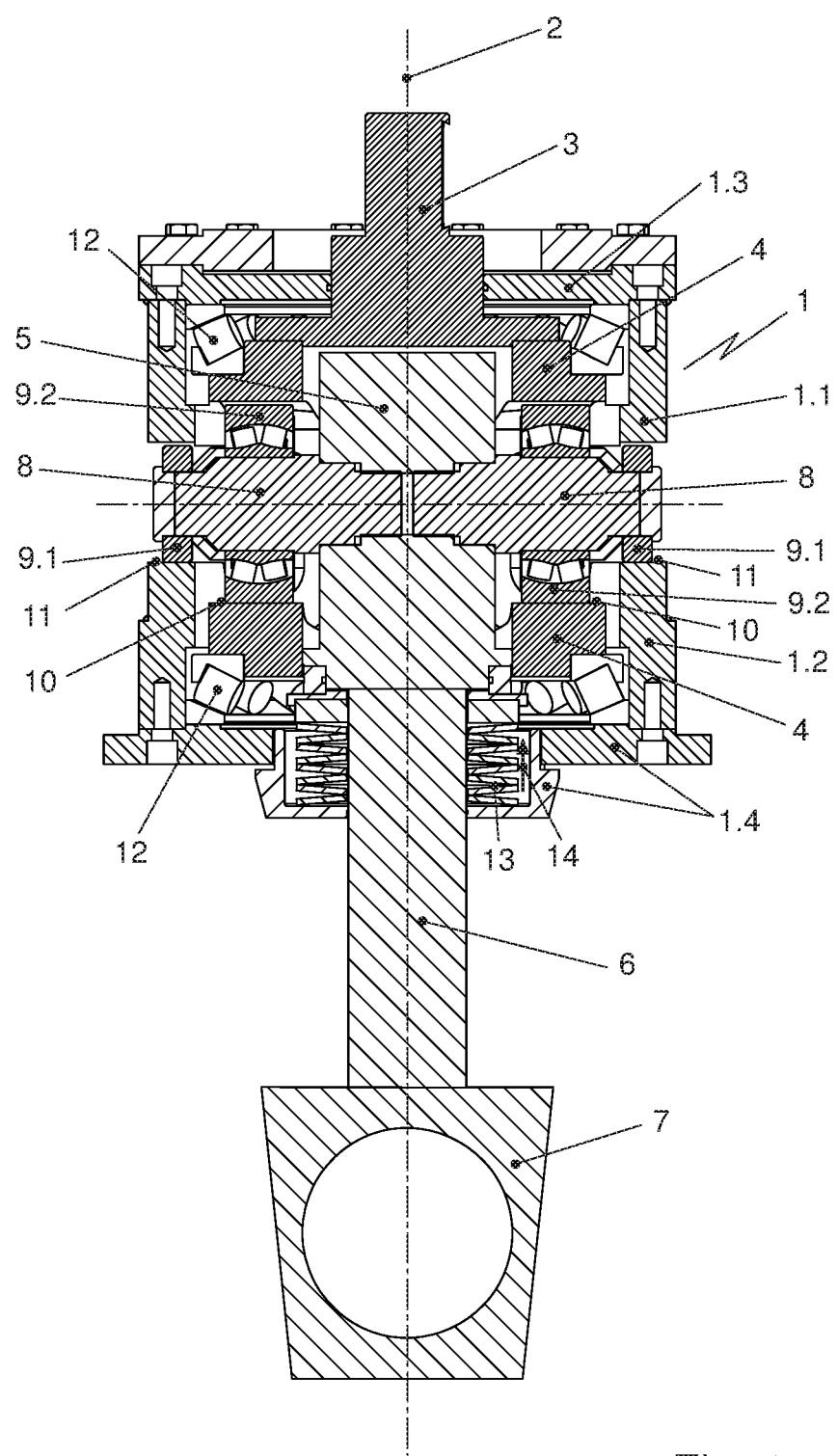
FIG. 1: a sectional view of an arrangement for actuating a shut-off valve with a tapered plug.

FIG. 1 shows an arrangement for actuating a shut-off valve with a tapered plug. The arrangement includes a housing 1, composed of an upper housing part 1.1 and a lower housing part 1.2. The upper housing part 1.1 has a top cover 1.3 and the lower housing part 1.2 has a bottom cover 1.4. An axis 2 extends through the housing 1. The housing 1 of the arrangement for actuating a shut-off valve with a tapered cone is fixedly connected to the unillustrated valve body of the shut-off valve. The housing 1 is arranged coaxially with respect to the axis 2 of a hollow actuating cylinder 4, on which an actuating shaft 3 is fixedly attached. The actuating shaft 3 is passed to the outside through a through-opening in the top housing cover 1.3.

The hollow actuating cylinder 4 is arranged coaxially with the axis 2 in the housing 1 and supported for rotation about the axis 2. An output cylinder 5 is also arranged coaxially with the axis 2 in the hollow actuating cylinder 4. This output cylinder 5 is axially movable along the axis 2 and supported in the hollow actuating cylinder 4 for rotation about the axis 2.

A spindle 6 is affixed on the output cylinder 5 in opposition to the actuating shaft 3, with a tapered plug being rigidly attached at the end of the spindle 6 facing away from the output cylinder 5.

For the passage of the actuating shaft 3 and the spindle 6, the upper housing cover 1.3 and the lower housing cover 1.4 each have a through-opening. The output cylinder 5 has on its outer peripheral surface two pins 8 oriented radially outwardly in opposite directions with rotating rollers 9.1 and 9.2. The pins 8 are orthogonal to the axis 2. Each pin 8 supports two rotatable rollers 9.1 and 9.2, which can rotate independently from each other with a small spacing on their respective pin 8. The rotating rollers 9.1 and 9.2 are placed on the pin 8 so that they can roll on longitudinal sides of guideways 10 and 11, which are disposed as through-openings in the outer surfaces of the hollow actuating cylinder 4 and the housing 1 and which pass through or engage with the pins 8. The guideways 10 and 11 each extend over respective radial sectors of the peripheral surfaces of the housing 1 and the hollow actuating cylinder 4.

The rotatable rollers 9.1 and 9.2 can be rollably introduced into the through-openings forming the guideways 10 and 11 and have an outer diameter that is smaller than the width of the aforementioned through openings. The guideways 10 and 11 and the pins 8 with the rotatable rollers 9.1 and 9.2 arranged thereon are operatively connected in the form of a total of four sliding blocks.

A spring element 13 formed of diaphragm springs is arranged between the output cylinder 5 and the lower housing cover 1.4. The spring element 13 is biased with an effective direction of the spring force F in the direction of the arrow 14, i.e. in the direction of movement for lifting the tapered plug 7, and installed between the output cylinder 5 and the lower housing cover 1.4. The spring force F of the spring element is dimensioned such that it corresponds to the sum of the forces from the weight forces $F_5$ on the output cylinder 5, the weight force $F_6$ acting on the spindle 6 and the weight force $F_7$ acting on the conical plug 7 plus a force F, that corresponds the 5 to 7.5 times, preferably 6 times, the aforementioned sum of the forces from the weight forces acting on the output cylinder 5, the spindle 6 and the tapered plug 7. The spring force F is thus calculated according to the formula $$F = F_5 + F_6 + F_7 + 5 \ldots 7.5 \times (F_5 + F_6 + F_7),$$

preferably $$F = F_5 + F_6 + F_7 + 6 \times (F_5 + F_6 + F_7),$$

or $$F = 6 \ldots 8.5 \times (F_5 + F_6 + F_7),$$

preferably $$F = 7 \times (F_5 + F_6 + F_7).$$

Figure 2:
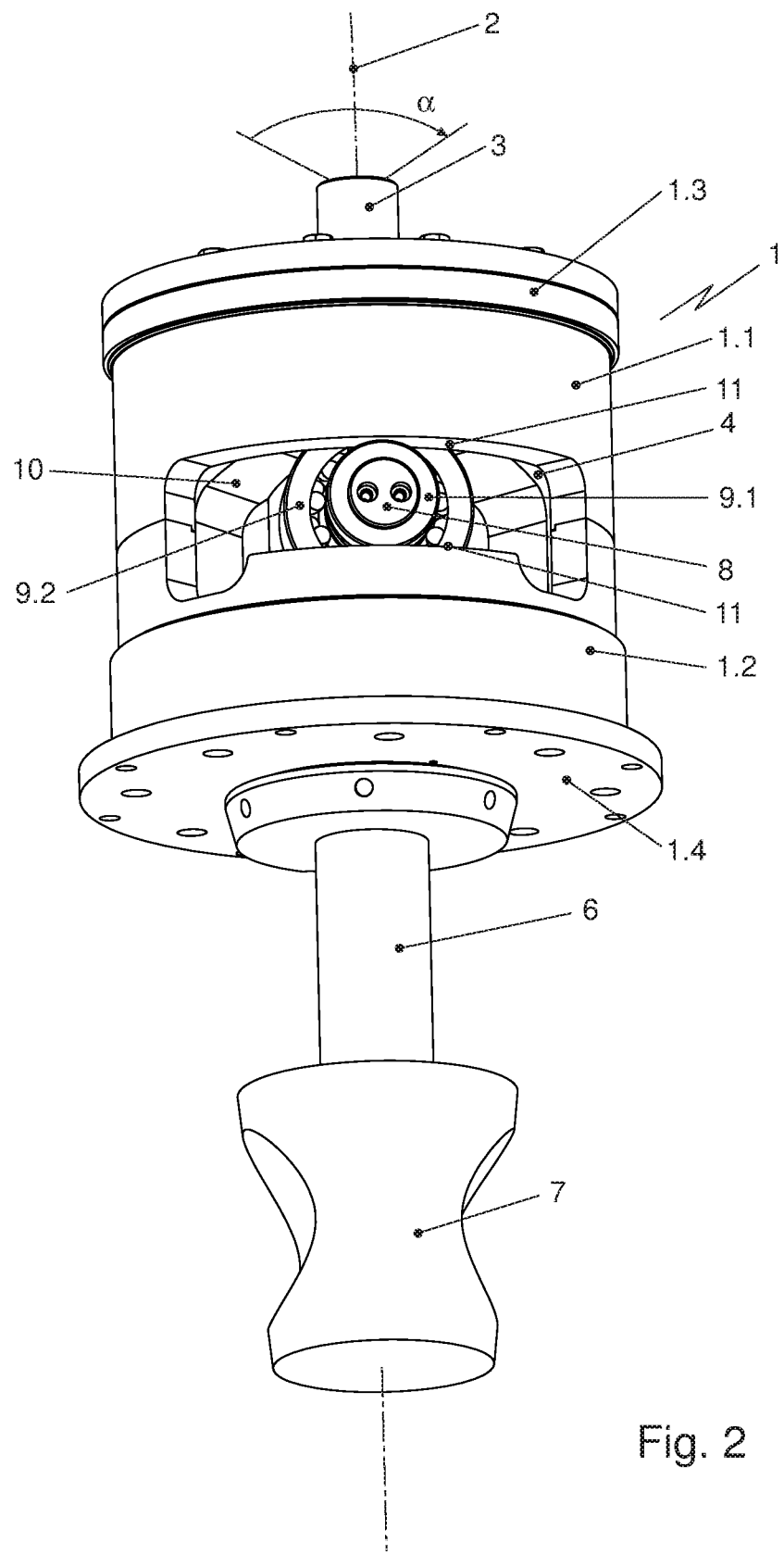
FIG. 2: a 3D-representation an arrangement for actuating a shut-off valve with a tapered plug.

FIG. 2 shows very clearly the roller 9.1 having an associated guideway 11 formed by a through-opening in the outer surface of the housing 1. This through-opening follows in its longitudinal side facing the tapered plug 7 a straight course, which has at both respective ends thereof in a curvy bulge in the direction of the tapered plug 7. FIG. 2 also illustrates that the rotatable roller 9.1 is constructed as a roller slidingly supported on the pin 8. In contrast, the roller 9.2 rolling on the guideway 10 is implemented on the pin 8 as a roller bearing.

A rotation angle α shows the possible rotation of the hollow actuating cylinder 4 in relation to the housing 1.

Figure 3:
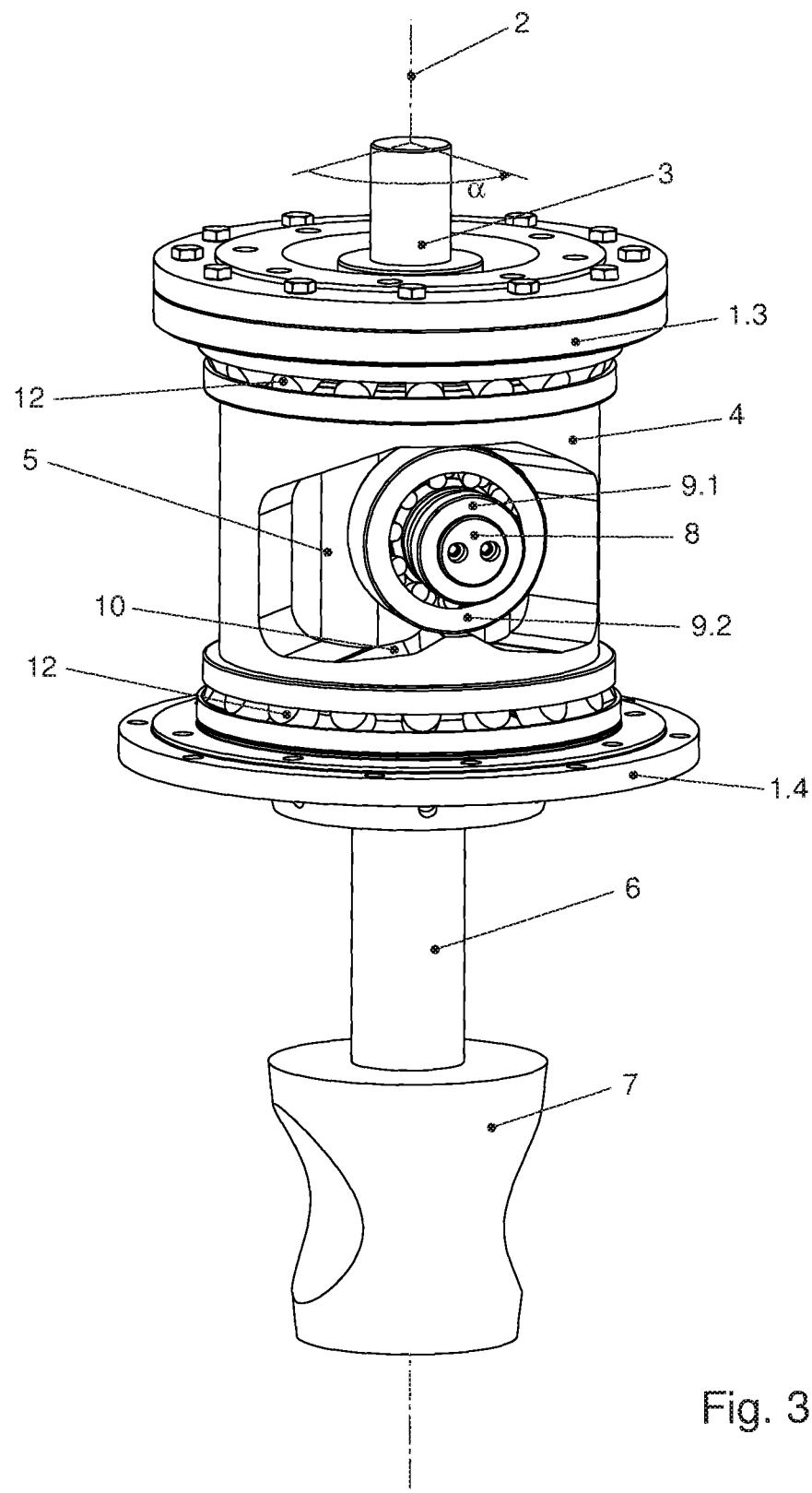
FIG. 3: a 3D-representation of an arrangement for actuating a shut-off valve with a tapered plug, wherein the outer surface of the housing is not shown.

FIG. 3 shows a 3D-diagram of the arrangement for actuating a shut-off valve with a tapered plug 7, wherein the outer surface of the housing 1 has been omitted. Particularly clearly shown is the rotatable roller 9.2, which is formed as a roller bearing on the pin 8. The roller 9.2 rolls on the guideway 10 in the through-opening disposed in the outer surface of the hollow actuating cylinder 4, when the actuating cylinder 4 is rotated by the actuating shaft 3. The hollow actuating cylinder 4 is hereby supported relative to the housing 1 by the roller bearings 12. Its possible rotation relative to the housing 1 is also illustrated in FIG. 3 by the rotation angle α.

Figure 4:
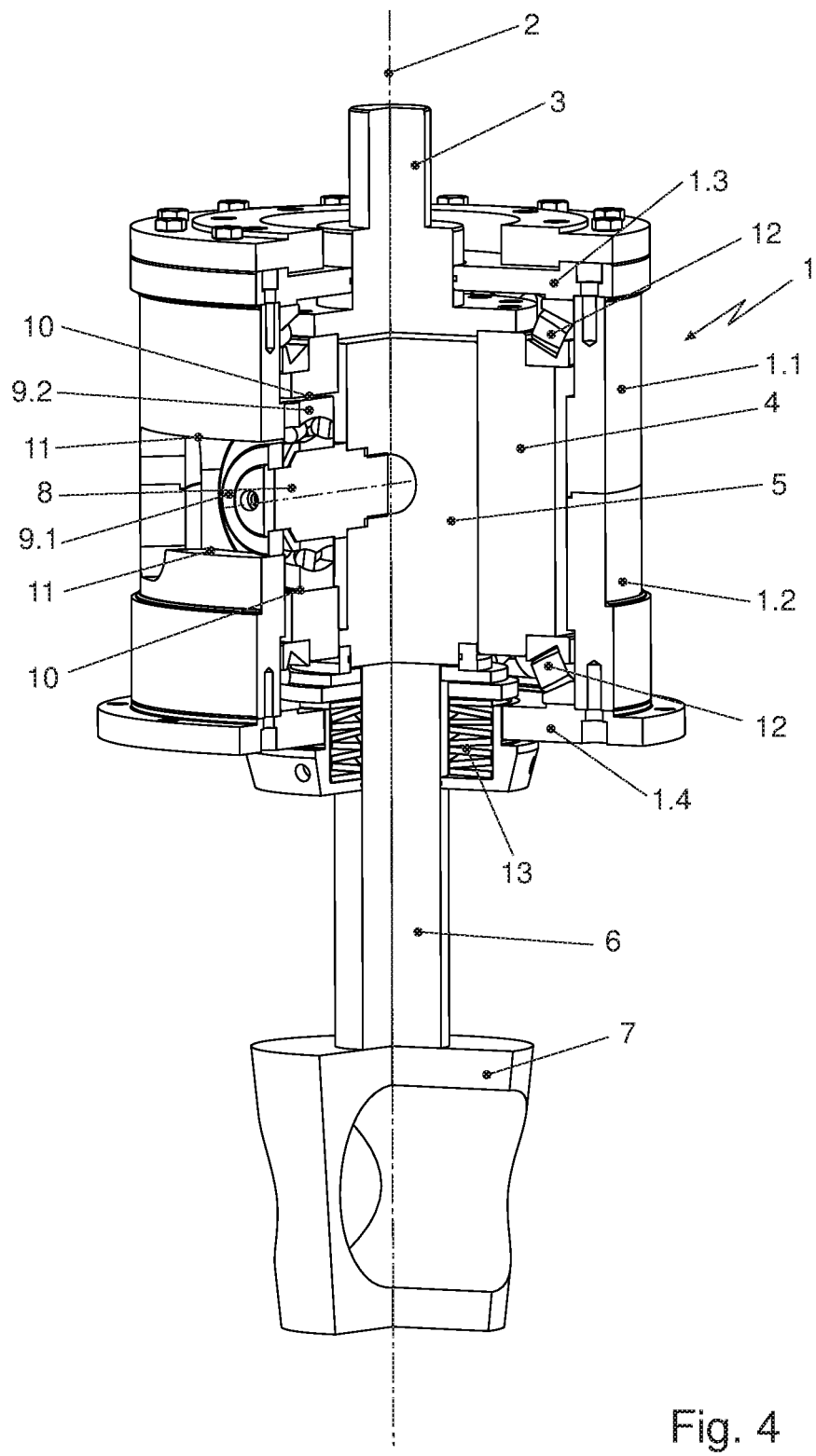
FIG. 4: a partially sectioned 3D-representation of an arrangement for actuating a shut-off valve with a tapered plug.

FIG. 4 shows a partially sectioned view of a 3D-diagram of an arrangement for actuating a shut-off valve with a tapered plug. FIG. 4 shows particularly clearly the coaxial arrangement of the output cylinder 5, the hollow actuating cylinder 4 and the housing 1. FIG. 4 also shows very clearly the arrangement of one of the two pins 8 radially protruding from the output cylinder 5 and its passage through the through-opening in the outer surface of the hollow actuating cylinder 4, and its engagement with the through-opening of the housing 1.

Figure 5:
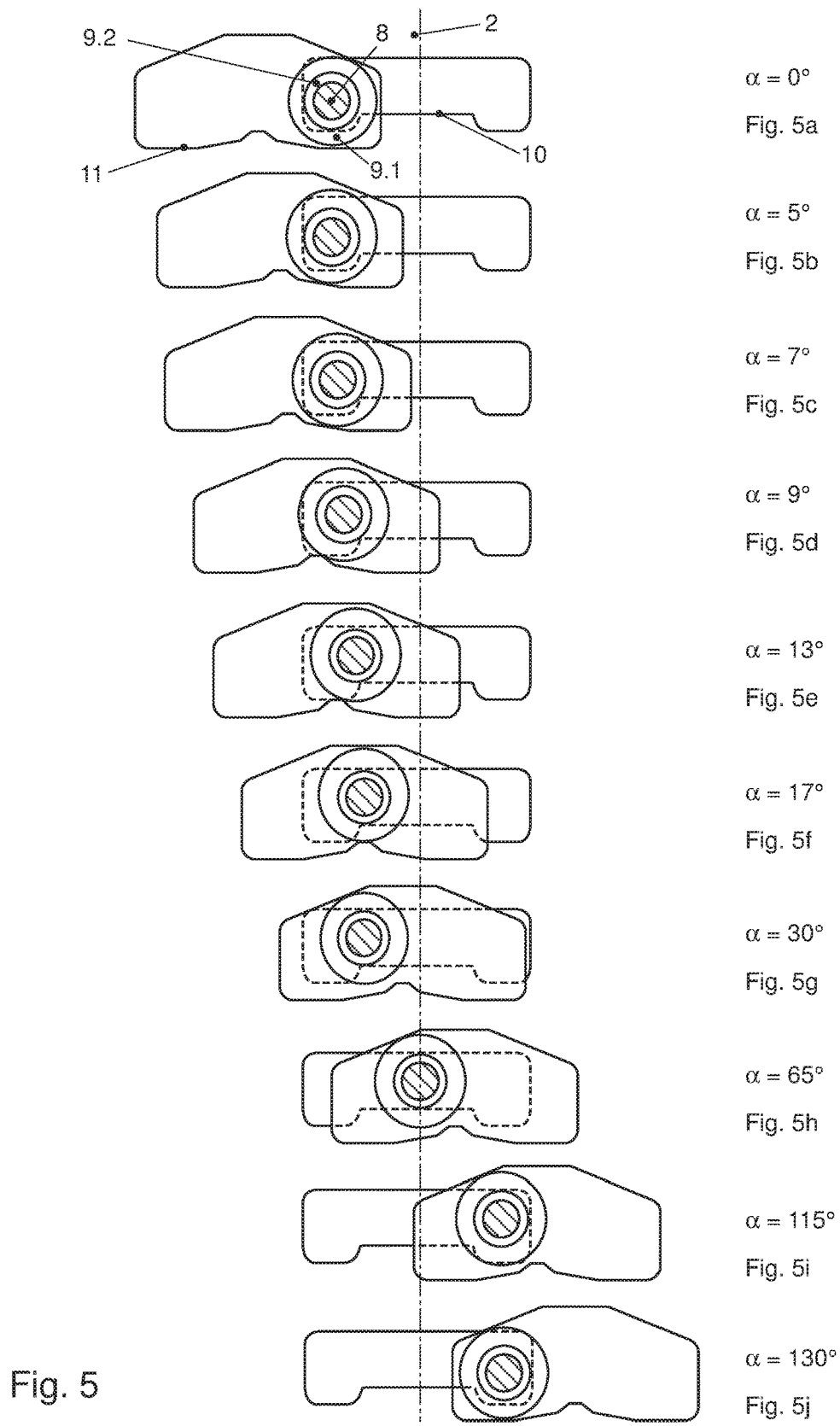
FIG. 5: a schematic diagram of the movement of the pin in response to the rotation of the actuating cylinder relative to the housing.

FIG. 5 shows schematically the movement of a pin 8 as a function of the displacement of the actuating cylinder 4 with respect to the housing 1, when a shutoff valve with a tapered plug is opened by the arrangement for actuating a shutoff valve with a tapered plug.

FIG. 5 includes the partial FIGS. 5a to 5j, which illustrate the movements of the guideways 10 and 11 and of the rollers 9.1 and 9.2 that are rotatably supported on the pin 8 for different rotation angles a the hollow actuating cylinder 4 with respect to the housing 1. The reference axis for the rotation of the hollow actuating cylinder 4 with respect to the housing is the axis 2.

The guideway 10 includes one region disposed orthogonal to the axis 2 and two mutually aligned regions in the direction of the axis 2. The guideway 11 has one region disposed orthogonal to the axis 2 and two regions disposed obliquely to the axis 2. The regions oriented obliquely to the axis 2 form an ascending and a descending region.

Partial FIG. 5a shows the relative position of the guideways 10 and 11 to each other at a rotation angle α of the hollow actuating cylinder 4 relative to the housing 1 of α=0°. The rollers 9.1 and 9.2 are each located at the lowest point. The shut-off valve with the tapered plug 7 is closed and the outer surface of the tapered plug 7 is in fixed abutment with the seat surface.

Partial FIG. 5b shows the relative position of the guideways 10 and 11 to each other at a rotation angle α of the hollow actuating cylinder 4 relative to the housing 1 of α=5°. The rotation of the hollow actuating cylinder 4 about this rotation angle α=5° forces the roller 9.1 to roll on the ascending part of the guideway 11 and to move both itself and the pin 8 carrying the roller 9.1 along the guideway 11. The roller 9.2 rolls on the guideway 10. The output cylinder 5 follows the movement of the pin 8 and rises, without rotating, in the longitudinal direction of the axis 2 commensurate with the guideway 11. The output cylinder 5 then lifts the tapered plug 7 out of the seat via the spindle 6. The outer surface of the tapered plug 7 is released from the seat surface.

As the partial FIGS. 5c to 5e show, during further rotation of the hollow actuating cylinder 4 relative to the housing 1, the pin 8 rotates about the axis 2 in addition being raised in the longitudinal direction of the axis 2. Therefore, the tapered plug 7 that is fixedly connected with the output cylinder 5 via the spindle 6 and was as described already raised from its seat, also rotates from the closed position toward the open position.

As shown in the partial FIG. 5e, the roller 9.1 has reached the highest point of the ascending portion of the guideway 11 at a rotation angle of α=13° and transferred its movement via the pin 8 to the output cylinder 5, which has, in turn, raised the tapered plug 7 maximally via the spindle 6.

As shown in the partial FIGS. 5f-5i, when the hollow actuating 4 cylinder is rotated further in a rotation angle range 13°<α<115°, the pin 8 is not moved farther in the direction of the upper housing part 1.1, since due to the guiding of the rollers 9.1 and 9.2 in both guideways 10 and 11, the pin 8 can rotate only about the axis 2. Therefore, in the aforementioned rotation angle range of the hollow actuating cylinder 4, only a rotation of the output cylinder 5 and thus the tapered plug 7 is effected. The tapered plug 7 is thus rotated when in the raised position, so that the tapered plug 7 is moved from the closed to the open position with low wear.

As the diagram of the partial FIG. 5j shows, upon further rotation of the hollow actuating cylinder 4 in the rotation angle range of 115°<α<130°, the pin 8 is again lowered, because the roller 9.1 rolls on the descending part of the guideway 11. Consequently, the output cylinder 5 supporting the pin 8 and the tapered plug 7 connected with the output cylinder 5 by way of the spindle 6 are also lowered. The output cylinder 5 is lowered in the longitudinal direction of the axis 2 without rotating about the axis 2, because the guideway 10 of the roller 9.2 allows only a vertical movement of the pin 8 in the illustrated range. The lowering movement of the tapered plug 7 moves the tapered plug 7 into its seat after rotation into the open position. The outer surface of the tapered plug 7 then abuts the seat surface.

This movement completes the low-wear opening of the shut-off valve with tapered plug 7. A rotation of the hollow actuating cylinder 4 relative to the housing 1 in the opposite direction, similar to the aforedescribed process, closes the shut-off valve with tapered plug 7 in a low-wear manner.

LIST OF REFERENCE NUMERALS

1 Housing
1.1 Upper housing part
1.2 Lower housing part
1.3 Housing cover
1.4 Housing cover
2 Axis
3 Actuating shaft
4 Hollow actuating cylinder
5 Output cylinder
6 Spindle
7 Tapered plug
8 Pin
9.1 Roller
9.2 Roller
10 Guideway
11 Guideway
12 Roller bearing
13 Spring element
14 Arrow
α Rotation angle
F Force, spring force

The invention claimed is:

1. An arrangement for actuating a shut-off valve, the arrangement comprising:
a housing (1) having an axis (2) extending longitudinally therethrough between a top cover (1.3) and an opposite bottom cover (1.4),
a hollow actuating cylinder (4) coaxially aligned with the axis (2) and rotatable within the housing (1),
an actuating shaft (3) coaxially aligned with the axis (2) and is fixedly attached on the hollow actuating cylinder (4),
an output cylinder (5) coaxially aligned with the axis (2) and disposed in the hollow actuating cylinder (4); and the output cylinder (5) is axially and radially movable with respect to the hollow actuating cylinder (4), a spindle (6) fixedly mounted on the output cylinder (5) and coaxially aligned with the axis (2) opposite the actuating shaft (3), a tapered plug (7) affixed on an end of the spindle (6) facing away from the output cylinder (5), wherein the housing (1) and the hollow actuating cylinder (4) each have an outer surface; a first guideway (10) extending as a through opening over a radial sector of the outer surface of the hollow actuating cylinder (4); a second guideway (11) extending as a through opening over a radial sector of the outer surface of the housing (1), a third guideway extending as a through opening over a radial sector of the outer surface of the hollow actuation cylinder (4) and a fourth guideway extending as a through opening over a radial sector of the outer surface of the housing (1); wherein the first and second guideways form a first pair of guideways while the third and fourth guideways form a second pair of guideways; and the first and second pair of guideways extending over radially opposite sectors of the outer surfaces of the hollow actuation cylinder (4) and the housing (1), two pins (8) oriented outwardly in opposite radial directions, one of the two pins (8) passes through the respective through opening of each of the first and second guideways, while another of the two pins (8) passes through the respective through opening of each of the third and fourth guideways, wherein the hollow actuating cylinder (4) is supported relative to the housing (1) by roller bearings (12) disposed both above and below the hollow actuating cylinder, wherein each roller bearing is arranged obliquely relative to the axis (2), wherein the roller bearings (12) support the hollow actuating cylinder (4) a predetermined distance separation relative to the bottom cover (1.4) of the housing (1) so that no portion of the hollow actuating cylinder (4) is in direct physical contact with the bottom cover (1.4) of the housing (1), a spring (13) arranged between the output cylinder (5) and the bottom cover (1.4), the spring (13) producing a spring force (F) that lifts the tapered plug (7), wherein the spring force (F) is greater than weight forces acting on the output cylinder (5), the spindle (6) and the tapered plug (7).

2. The arrangement for actuating a shut-off valve according to claim 1, wherein the spring force (F) is equal to between 5 times and 7.5 times the weight forces acting on the output cylinder (5), the spindle (6) and the tapered plug (7).

3. The arrangement for actuating a shut-off valve according to claim 1, wherein the spring force (F) is equal to between 6 times and 8.5 times the weight forces acting on the output cylinder (5), the spindle (6) and the tapered plug (7).

4. The arrangement for actuating a shut-off valve according to claim 1, wherein the spring (13) is constructed as a diaphragm spring.

5. The arrangement for actuating a shut-off valve according to claim 1, wherein the housing (1) comprises an upper housing part (1.1) and a lower housing part (1.2).

6. The arrangement for actuating a shut-off valve according to claim 5, wherein the upper housing part (1.1) comprises the top cover (1.3) with a through-opening for passage of the actuating shaft (3) and the lower housing part (1.2) comprises the bottom cover (1.4) with a through-opening for passage of the spindle (6).

7. An arrangement for actuating a shut-off valve, the arrangement comprising:

a housing (1) having an axis (2) extending longitudinally therethrough, a hollow actuating cylinder (4) coaxially aligned with the axis (2) and rotatable within the housing (1), an actuating shaft (3) coaxially aligned with the axis (2) and is fixedly attached on the hollow actuating cylinder (4), an output cylinder (5) coaxially aligned with the axis (2) and disposed in the hollow actuating cylinder (4); and the output cylinder (5) is axially and radially movable with respect to the hollow actuating cylinder (4), a spindle (6) fixedly mounted on the output cylinder (5) and coaxially aligned with the axis (2) opposite the actuating shaft (3), a tapered plug (7) affixed on an end of the spindle (6) facing away from the output cylinder (5), a pin (8) is radially outwardly oriented on an outer peripheral surface of the output cylinder (5), wherein the housing (1) and the hollow actuating cylinder (4) each have an outer surface; a first guideway (10) extending over a radial sector of the outer surface of the hollow actuating cylinder (4); a second guideway (11) extending over a radial sector of the outer surface of the housing (1), and the pin (8) is operatively connected to each of the first and second guideways (10 and 11) in the manner of a respective sliding block, and wherein the first guideway (10) arranged in the outer surface of the hollow actuating cylinder (4) is a through-opening through which the pin (8) passes, wherein a roller (9.2) rotatable on the pin (8) about a longitudinal axis of the pin (8) is movable as a sliding block in the first guideway (10) formed as a through-opening in the outer surface of the hollow actuating cylinder (4), wherein the hollow actuating cylinder (4) is supported relative to the housing (1) by roller bearings (12) disposed both above and below the hollow actuating cylinder, wherein each roller bearing is arranged obliquely relative to the axis (2), wherein the roller bearings (12) support the hollow actuating cylinder (4) a predetermined distance separation relative to a bottom cover (1.4) of the housing (1) so that no portion of the hollow actuating cylinder (4) is in direct physical contact with the bottom cover (1.4) of the housing (1), a spring (13) arranged between the output cylinder (5) and the bottom cover (1.4), the spring (13) producing a spring force (F) that lifts the tapered plug (7), wherein the spring force (F) is greater than weight forces acting on the output cylinder (5), the spindle (6) and the tapered plug (7).

8. The arrangement for actuating a shut-off valve according to claim 7, wherein the spring force (F) is equal to between 5 times and 7.5 times the weight forces acting on the output cylinder (5), the spindle (6) and the tapered plug (7).

9. The arrangement for actuating a shut-off valve according to claim 7, wherein the spring force (F) is equal to between 6 times and 8.5 times the weight forces acting on the output cylinder (5), the spindle (6) and the tapered plug (7).

10. The arrangement for actuating a shut-off valve according to claim 7, wherein the spring (13) is constructed as a diaphragm spring.

11. An arrangement for actuating a shut-off valve, the arrangement comprising:
- a housing (1) having an axis (2) extending longitudinally therethrough,
- a hollow actuating cylinder (4) coaxially aligned with the axis (2) and rotatable within the housing (1),
- an actuating shaft (3) coaxially aligned with the axis (2) and is fixedly attached on the hollow actuating cylinder (4),
- an output cylinder (5) coaxially aligned with the axis (2) and disposed in the hollow actuating cylinder (4); and the output cylinder (5) is axially and radially movable with respect to the hollow actuating cylinder (4),
- a spindle (6) fixedly mounted on the output cylinder (5) and coaxially aligned with the axis (2) opposite the actuating shaft (3),
- a tapered plug (7) affixed on an end of the spindle (6) facing away from the output cylinder (5),
- a pin (8) is radially outwardly oriented on an outer peripheral surface of the output cylinder (5),
- wherein the housing (1) and the hollow actuating cylinder (4) each have an outer surface; a first guideway (10) extending over a radial sector of the outer surface of the hollow actuating cylinder (4); a second guideway (11) extending over a radial sector of the outer surface of the housing (1), and the pin (8) is operatively connected to each of the first and second guideways (10 and 11) in a manner of a respective sliding block, and
- further comprising two rollers (9.1 and 9.2) rotatable about a longitudinal axis of the pin (8), the two rollers (9.1 and 9.2) are spaced apart on the pin (8) in the direction of the longitudinal axis of the pin (8), and positioned so that one of the two rollers is movable as a sliding block in the first guideway (10) formed as a through-opening in the outer surface of the hollow actuating cylinder (4) through which the pin (8) passes and another of the two rollers is movable as a sliding block in the second guideway (11) formed as a through-opening in the outer surface of the housing (1),
- wherein the hollow actuating cylinder (4) is supported relative to the housing (1) by roller bearings (12) disposed both above and below the hollow actuating cylinder, wherein each roller bearing is arranged obliquely relative to the axis (2),
- wherein the roller bearings (12) support the hollow actuating cylinder (4) a predetermined distance separation relative to a bottom cover (1.4) of the housing (1) so that no portion of the hollow actuating cylinder (4) is in direct physical contact with the bottom cover (1.4) of the housing (1),
- a spring (13) arranged between the output cylinder (5) and the bottom cover (1.4), the spring (13) producing a spring force (F) that lifts the tapered plug (7), wherein the spring force (F) is greater than weight forces acting on the output cylinder (5), the spindle (6) and the tapered plug (7).

12. The arrangement for actuating a shut-off valve according to claim 11, wherein the spring force (F) is equal to between 5 times and 7.5 times the weight forces acting on the output cylinder (5), the spindle (6) and the tapered plug (7).

13. The arrangement for actuating a shut-off valve according to claim 11, wherein the spring force (F) is equal to between 6 times and 8.5 times the weight forces acting on the output cylinder (5), the spindle (6) and the tapered plug (7).

14. The arrangement for actuating a shut-off valve according to claim 11, wherein the spring (13) is constructed as a diaphragm spring.

15. The arrangement for actuating a shut-off valve according to claim 11, wherein the two rollers (9.1 and 9.2) are rollably insertable into the respective first and second guideways (10 and 11).

16. The arrangement for actuating a shut-off valve according to claim 15, wherein the outer diameter of each of the two rollers (9.1 and 9.2) is undersized compared to a width of the respective through-openings (10 and 11).

* * * * *